(12) United States Patent
Heisig et al.

(10) Patent No.: US 7,127,517 B2
(45) Date of Patent: Oct. 24, 2006

(54) PROTOCOL ADAPTER FRAMEWORK FOR INTEGRATING NON-IIOP APPLICATIONS INTO AN OBJECT SERVER CONTAINER

(75) Inventors: Stephen Heisig, Tarrytown, NY (US); Donna Dillenberger, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 392 days.

(21) Appl. No.: 09/748,831

(22) Filed: Dec. 27, 2000

(65) Prior Publication Data

US 2002/0083214 A1   Jun. 27, 2002

(51) Int. Cl.
    *G06F 15/16*   (2006.01)
(52) U.S. Cl. .................. 709/230; 709/203; 719/315
(58) Field of Classification Search ........ 709/201–203, 709/228, 316, 217–219, 230–231; 707/3, 707/10, 103 R; 713/201; 719/315, 316
See application file for complete search history.

(56) References Cited

U.S. PATENT DOCUMENTS

| | | | | |
|---|---|---|---|---|
| 5,329,619 A * | 7/1994 | Page et al. | ................... | 709/203 |
| 5,473,773 A | 12/1995 | Aman et al. | | |
| 5,812,768 A * | 9/1998 | Page et al. | ................... | 709/228 |
| 6,014,694 A * | 1/2000 | Aharoni et al. | ............. | 709/219 |
| 6,173,327 B1 * | 1/2001 | De Borst et al. | ........... | 709/231 |
| 6,219,790 B1 * | 4/2001 | Lloyd et al. | ................. | 713/201 |
| 6,427,153 B1 * | 7/2002 | Nelson et al. | .......... | 707/103 R |
| 6,573,907 B1 * | 6/2003 | Madrane | ...................... | 345/719 |
| 6,609,121 B1 * | 8/2003 | Ambrosini et al. | ............ | 707/3 |
| 6,654,794 B1 * | 11/2003 | French | ........................ | 709/217 |
| 6,721,779 B1 * | 4/2004 | Maffeis | ...................... | 709/202 |
| 6,763,395 B1 * | 7/2004 | Austin | ........................ | 709/245 |

* cited by examiner

*Primary Examiner*—William Thomson
*Assistant Examiner*—V. Hoa Nguyen
(74) *Attorney, Agent, or Firm*—Ohlandt, Greeley, Ruggiero & Perle, L.L.P.; Daniel P. Morris, Esq.

(57) ABSTRACT

In a computer system containing an object server, a method and apparatus for providing access to objects and methods via arbitrary remote protocols is disclosed. This includes a mechanism known as the protocol adapter framework that allows protocol adapters to manage remote socket sessions, encrypt communication on this session, translate text to the local character set, perform security validation of the remote user, log incoming work requests, classify the incoming work request for differentiated service purposes, and queue the work for execution. Also, included is a mechanism to invoke the protocol adapter in order to manipulate output from the execution of a method on a server object and send it back to the original requester. This allows the implementers of objects and methods that reside in the object server rather than the owner of the object server to provide a protocol adapter that allows communication with remote clients using any arbitrary protocol that the object implementer deems appropriate. In this way, the object implementer can enjoy benefits such as differentiated service, workload recording, server object process management, process isolation, error logging, systems management and transactional services of running objects in a robust object server container.

11 Claims, 2 Drawing Sheets

PROTOCOL ADAPTER FRAMEWORK FOR INTEGRATING NON-IIOP APPLICATIONS INTO AN OBJECT SERVER CONTAINER

FIELD OF THE INVENTION

The present invention relates to providing access to objects and methods in an Object server running on a computer system from a remote client via arbitrary protocols other than the Object server standard protocol, the selected arbitrary protocols being definable by the implementer of the server object, rather than the provider of the Object server container. "Object server" is defined as a software program that provides the mechanisms to instantiate, communicate with, invoke methods on, save, and destroy objects on a server from a remote client machine. It also implements the Object server container. "Object server container" is defined as software that provides services to raw class libraries representing objects. These services include managing the Implementation Registry, process and thread management for object instances, assigning unique reference ids to new objects, publicizing the services it provides, authenticating a clients' access to the objects and methods, dispatching incoming client requests to the appropriate stub, as well as providing transactional systems management, and persistence related functions.

DESCRIPTION OF RELATED ART

Object servers, sometimes known as object brokers, typically provide access to objects via some middleware standard protocol such as the CORBA (Common Object Request Broker Architecture) IIOP (Internet Inter-Orb Protocol) which runs on top of a communications protocol such as Transmission Control Protocol/Internet Protocol (TCP/IP). While this standard protocol allows the object server to interoperate with client ORBs (Object Request Brokers) on heterogeneous platforms that conform to the standard protocol, it has some drawbacks. Among these are difficulties in flowing the protocol across firewalls, the heavy weight and high number of network flows required, and the complexity of the client ORB and large footprint required to support the protocol on the client machine. This is especially a problem for smaller, low-power, pervasive devices. Also, there exist other protocols which are defined by standards such as the IETF (Internet Engineering Task Force), RTSP (Real Time Streaming Protocol) which could be used to communicate with objects running in the object server's container.

Some object servers have provided access via HTTP to some subset of the functions available in their containers, but while this provides one possible solution to some of the problems, it is at the discretion of the object server provider and is implemented as a special case in the proprietary code of the container. To enable another protocol would require another change to the proprietary code of the container, and will only be made if the object server container provider feels there is sufficient business reason for the development expense. For new application types that wish to take advantage of the services available in the object container but don't wish to use IIOP, this will not be apparent.

SUMMARY OF THE INVENTION

The primary object of the present invention is to provide a method and apparatus that will allow the developer of an application embodied by objects and methods residing in an object server to define an arbitrary distributed protocol appropriate to the application and to use this protocol to communicate with remote clients. Thereby, the current inability in prior art for the application developer to choose and implement a protocol appropriate to the particular distributed application is overcome.

A secondary goal of the invention is to allow different programming models to be used by client machines in accessing objects and methods in the Object server. Consequently, a client need not explicitly be invoking methods in the object server but instead using a more natural programming model which is translated by the Protocol Adapter into methods on an object in the object server. Services are provided to allow the developer to code the Protocol Adapter to a high level API (Application Program Interface) to accomplish functions common to distributed applications in a non-system specific way. This allows the developer to code a "thinner" application rather than being responsible for knowing all the details of specific systems socket programming model, interface to its security product, etc.

It will become apparent to those skilled in the art, as the description proceeds, that the invention overcomes inefficiencies in the prior art by allowing the developer to use the same services for systems management that the implementer of the server container uses. This results in less code that the developer has to create; moreover, a common systems management interface for all application residing in the container simplifies the overall systems management task.

The exclusive right in accordance with the present invention is defined as follows: A computer system coupled to work stations operated by remote clients comprising an object server container within the system, the container having a plurality of server objects relating to specific servers; means for providing access to the server objects from the remote clients, said means including a protocol adapter framework for supporting an appropriate arbitrary protocol between the clients and the server objects, the protocol adapter being operable to translate client requests into method requests on an object residing within an object server.

The foregoing and still further objects and advantages of the present invention will be more apparent from the following detailed explanation of the preferred embodiments of the invention in connection with the accompanying drawings:

DETAILED DESCRIPTION OF THE INVENTION

Figure 1:
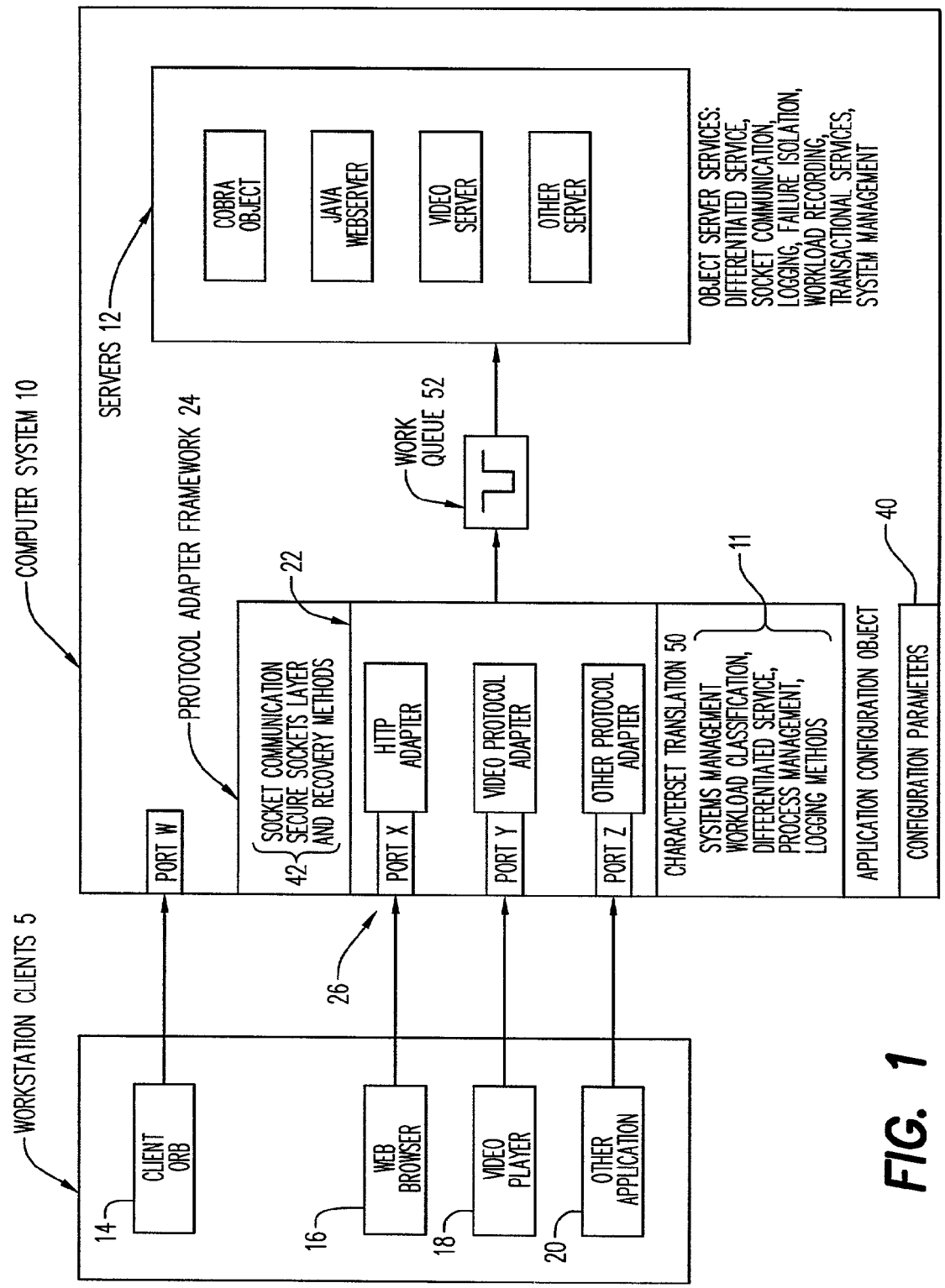
FIG. 1 is a block diagram of a computer system with a protocol adapter framework and various protocol adapters along with the methods the protocol adapter framework provides and their relation to an object server according to the present disclosure.

The present invention is directed to a computer system on which an object broker (also known as an Object server) is capable of providing services for remote clients. Referring to FIG. 1, an exemplary computer system 40 is shown including Object servers 112 capable of running several different types of work concurrently in which one type is a traditional client request from an ORB 14 (Object Request Broker) by way of an object oriented program, while another is an HTTP request from a web browser 16 and another is a request from a Video player 18. A fourth request is from other application 20 for an arbitrary server implemented by methods and objects in the object server from its workstation client.

It will be understood that when the Object server is initialized, installed Protocol Adapters 22 are invoked by the Protocol Adapter Framework 24. This allows them to wait on a predefined port 26 (x,y,z) for requests from remote clients. The port number is an example of a parameter that in a stand-alone application (one that is not implemented by objects in an Object Server) would be defined in an initialization file. In the case of an application that resides in an Object server container, this parameter can be set by a system administrator via the systems management tool and made available to the Protocol Adapter 22.

Parameter values reside in an Application Configuration Object 40 and are available via methods 42 targeting this object. The systems management tool can thus be used to configure the Object server container, which contains the plurality of servers 12 and the protocol adapter framework 24, and applications that reside within it. This simplifies the systems management task especially if there are a large number of machines hosting a small number of application types since it reduces the proliferation of initialization files, consolidating all this activity into a common tool.

Figure 2:
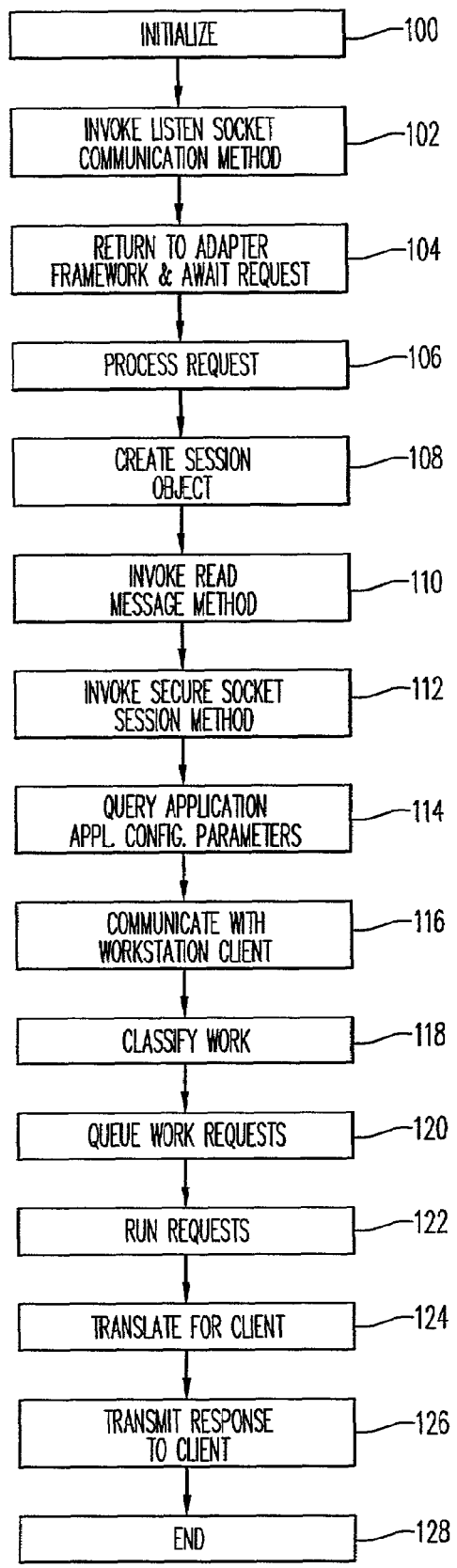
FIG. 2 is a logic diagram listing the process steps which the computer system of FIG. 1 performs in accordance with the present invention.

It will be appreciated that the software portion of the present invention instructs the computer system seen in FIG. 1 to perform the steps or operations depicted in FIG. 2. Thus, the system is initialized as seen by block 100 (FIG. 2) to begin performing the programmed steps based on the machine code stored on a conventional disk. A defined protocol adapter 22 is invoked by the adapter framework to perform the initialization. Then, the adapter invokes the listen socket communication method 42 on the communication port 26 it expects requests on. After invoking the Listen method provided by the Protocol Adapter Framework 24, each Protocol Adapter 22 waits for a work request (block 104). When a workstation client connects to the port, the protocol adapter manager is listening on a session object is created by the protocol adapter framework (block 106). Once a request arrives and the Protocol Adapter is given control, the Protocol Adapter would issue a peek method provided by the Framework on the session object (block 108), that returns a buffer translated to the local code page. A further part of the Framework provides methods (3) against the session object to initiate a Secure Sockets Layer (SSL) handshake, allow the server and client to authenticate themselves, select cryptographic algorithms, and establish an encrypted SSL connection, if desirable, for the particular protocol. The peeked buffer may contain some or all the information a Protocol Adapter needs to classify the incoming work request and derive the correct method, parameters and sever object to invoke. If necessary for a specific protocol further write and read methods (block 110) could be issued against the session object to get more information from the workstation client.

It will be understood that once the Protocol Adapter 22 is able to derive a method and object for this request, it will have to determine if the server object needs to be instantiated first. Some protocol adapters may only use methods on one Object server object and so may choose to instantiate it an initialization time, others may choose to instantiate on a per request basis, but others may keep a pool of instantiated objects ready. When the Protocol Adapter has all the information necessary to classify (block 118), the incoming work request, including possibly the identity of the requestor a call to the classification service 50 is made. The additional steps or operations of the basic process in accordance with the invention are signified by blocks 120–128 of FIG. 2.

The classification of work which derives a business importance form rules specified by the system administrator, and operation of the workload manager which provides queuing services and the process management mechanism form no part of this invention but are described in greater detail in U.S. Pat. No. 5,473,773 to J. D. Aman et al., entitled "Apparatus and Method for Managing a Data Processing System Workload According to Two or More Distinct Processing Goals"; a work request is placed on and removed from a queue using put_work and get_work services provided by the operating system. The operating system may be the IBM OS/390 operating system but the invention is not limited to this particular platform. It is part of the Object server structure in which this work request is detected and the correct server object is dispatched and that work classification and differentiated service which are well known in the art are provided. Once the work request has caused a Server object to become active, it begins executing the requested method with whatever parameters the protocol adapter may have specified.

It will now be fully understood how the previously stated goals of the invention are realized, including 1) the goal of the invention that this server object enjoys the benefits of services provided by the object Server container it is running in such as transactional services, process isolation for failure tolerance, management of ready processes, logging and execution tracing for diagnosis and recovery purposes, recovery and restart services, differentiated service by business importance and workload reporting for performance analysis; 2) the further goal of the invention that output generated by the server object may be processed by a method in the protocol adapter to send the data to the client workstation according to the protocol it expects. An alternative goal is for the server object to create an independent connection of its own with the client work station and transmit data according to a protocol (not necessarily the same as the original request protocol) that both remote client and server object agree upon.

After the Server object has completed execution and results have been returned to the client according to the proper protocol the session object may or may not be destroyed. If it is not, the Protocol Adapter may receive new requests on this session object while it has maintained the state of the session (client identity, cryptographic algorithm and key, code page, existence of Server object instance, etc.) otherwise, new requests will start from connecting to the port that the protocol adaptor is waiting on.

In order to provide a complete teaching to those in this art, the flow of an application request coming from a workstation client using a protocol defined by the implement of the server object, is listed in detail herewith:

Defined protocol adapters (1) are invoked by the protocol adapters framework (2) to perform initialization at object server startup time. A protocol adapter invokes the listen socket communication method (3) on the communication port (4) it expects requests on. The protocol adapter now returns to the adapter framework and is inactive until a request arrives. A request arrives from a workstation client (5) at the port the adapter is listening on. The protocol adapter is given control by the protocol adapter framework to process this request. A session object (6) is created by the protocol adapter framework which allows the protocol adapter to invoke methods against it to communicate with the client. A read message method is invoked against the session object to get the text of the incoming request. If necessary, character set translation is performed against the message text by invoking a translation framework method (7). Secure socket session methods can be invoked to create a secure (encrypted) session is the adapter requires. Application configuration parameters (8) can be queried by invoking methods against the systems management component of the object server. The protocol adapter communicates with the workstation client via send and read message methods until it has enough information to classify the work. Protocol adapter invokes a protocol adapter framework adapter method (9) to classify the work according to request type, client id, or other information. Protocol adapter queues the work request to an object server container (10 work queue (11). The method representing the request is run by the object server (12), it is managed and provided with differentiated service according to the classification performed by step 11. The method representing the request runs to completion and output is passed back to the adapter for translation to the character set and format of the remote client. The protocol adapter transmits this response to the client via send method. Alternatively, the method representing the request may open an additional socket for private communication with the client. Several requests may arrive on the original port which will cause the protocol adapter to drive more methods against the object representing the application under the same session object.

The invention having been thus described with particular reference to the preferred forms thereof, it will be obvious that various changes and modifications may be made therein without departing from the spirit and scope of the invention as defined in the appended claims.

Having thus described our invention, what we claim as new, and desire to secure by Letters Patent is:

1. A computer system coupled to work stations operated by remote clients comprising:

an object server container that comprises a plurality of server objects relating to specific, respective object servers of said workstations, wherein said object server container provides services that run in a first protocol in said object server container, wherein said server objects are operable to access said services, and wherein said first protocol differs from arbitrary protocols between the clients and the server objects;

a protocol adapter framework that provides access to the server objects from the remote clients, that comprises a plurality of protocol adapters, that uses at least some of said protocol adapters for communication with the remote clients using a plurality of first protocols, that supports a developer of an application embodied by said server objects and methods to define one or more of said arbitrary protocols, which are different than the first protocols, for communication between the clients and the server objects, and that responds to client requests in a natural programming model in at least one of said arbitrary protocols received via said protocol adapters to derive therefrom at least one method requests on at least one of said server objects residing within at least one of said object servers, wherein said protocol adapter framework processes an output generated by one of said object servers in response to a client request for transport to said requesting client according to a transport protocol that is expected by the requesting client, wherein the transport protocol differs from an arbitrary protocol of the requesting client.

2. The computer system as defined in claim 1, in which the plurality of server objects relate to at least a video server and a web server.

3. The computer system as defined in claim 1, in which at least one of the workstations includes a web browser and a video player.

4. The computer system as defined in claim 1, in which the protocol adapter framework includes an HTTP adapter.

5. The computer system as defined in claim 1, in which the protocol adapter framework includes a video protocol adapter.

6. The computer system as defined in claim 1, wherein different ones of said server objects relate to specific, respective ones of said arbitrary protocols that are used by specific, respective object servers of said workstations to access corresponding ones of said server objects.

7. The computer system as defined in claim 1, wherein said method requests are for said services.

8. The computer system as defined in claim 1, wherein said services run in a first protocol in said object server container, and wherein said first protocol differs from said arbitrary protocols.

9. The computer system as defined in claim 1, wherein said transport protocol is selected from the group consisting of: an arbitrary protocol of the requesting client and a second protocol that differs from said arbitrary protocol of the requesting client.

10. The computer system is claimed in claim 1, wherein said services are selected from the group consisting of: socket communication service layer and recovery methods, character set translation, systems management, workload classification, differentiated service, process management and logging methods.

11. The computer system as defined in claim 1, wherein said services are accessible by said developer.

* * * * *